Figure 1:
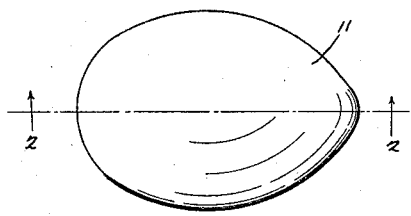

Dec. 6, 1927.  
T. W. MILLER  
TOY  
Filed Jan. 19, 1927

1,651,960

Thomas W. Miller  
Inventor  
by Smith and Freeman  
Attorneys

Patented Dec. 6, 1927.

1,651,960

UNITED STATES PATENT OFFICE.

THOMAS W. MILLER, OF ASHLAND, OHIO, ASSIGNOR TO THE FAULTLESS RUBBER COMPANY, OF ASHLAND, OHIO, A CORPORATION OF OHIO.

TOY.

Application filed January 19, 1927. Serial No. 162,144.

Figure 2:
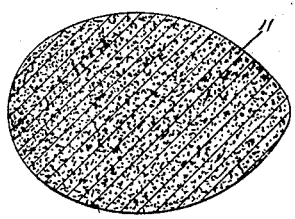
Figure 3:
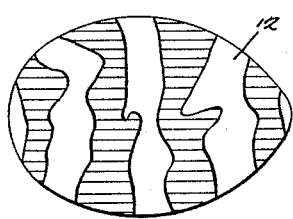
Figure 4:
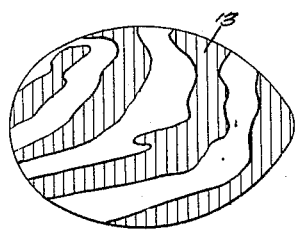
Figure 5:
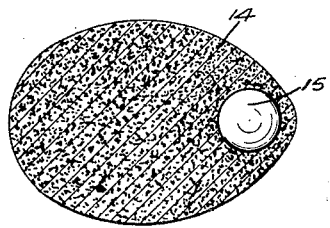

My invention relates to toys, and particularly to toy eggs, and the principal object of my invention is to provide a new and improved toy of this type. In the drawings accompanying this specification and forming a part of this application I have shown, for purposes of illustration, two forms which my invention may assume, and in these drawings:

Figure 1 is a side elevation of one form which my invention may assume,

Figure 2 is a longitudinal section through the form of my invention shown in Figure 1 taken on the line 2—2 of Figure 1, Figures 3 and 4 are side elevations showing variations possible in the form of my invention shown in Figures 1 and 2, while Figure 5 is a section similar to Figure 2 showing a second form which my invention may assume.

According to the embodiment of my invention shown in Figures 1 and 2 I form from sponge rubber, and in a suitable mold, the sponge rubber egg 11, the sponge rubber being formed with a skin roughened to simulate accurately the surface of a real egg, the entire egg being contoured to simulate accurately the contour of a real egg, and at least the skin being formed of a color accurately simulating the color of a real egg.

In Figures 3 and 4 I have shown variations of the form of my invention shown in Figures 1 and 2 wherein the surfaces of the sponge rubber eggs 12 and 13 have been colored to simulate varicolored Easter eggs, the coloring of these sponge rubber eggs 12 and 13 being applied in any suitable manner, as by dipping the egg to produce a solid coloring, or by spraying in any suitable manner, as in the manner set forth in Letters Patent of Carlos D. Hoppes Number 1,560,472 issued November 3, 1925, and the coloring matter in all cases being preferably rubber cement colored to produce the desired pattern.

In Figure 5 I have shown a second form which my invention may assume differing from the form shown in Figures 1 through 4 by the provision of means effective to cause the egg 14 to assume a rest position other than that which would normally be the rest position, herein shown as a steel ball 15 embedded in the sponge rubber of the egg 14 adjacent to the small or pointed end thereof.

It will of course be understood that the egg 14 may be surfaced in any desired manner, for example either like the egg 11 to resemble a real egg in its natural condition, or like the eggs 12 and 13 to resemble a varicolored egg, or otherwise.

Under these circumstances it will be obvious to those skilled in the art that I have provided a new and improved toy, and accordingly that I have accomplished at least the principal object of my invention.

At the same time it will also be obvious to those skilled in the art that the embodiments of my invention herein shown and described may be variously changed and modified without departing from the spirit of my invention, or sacrificing the advantages thereof, and it will therefore be understood that the disclosure herein is illustrative only, and that my invention is not limited thereto.

I claim:

1. A toy formed essentially of sponge rubber and having its surface of a contour and coloring closely simulating a colored Easter egg.

2. A toy formed essentially of sponge rubber and having its surface of a contour and varicoloring closely simulating a varicolored Easter egg.

3. A toy formed essentially of sponge rubber, having its surface of a contour closely simulating an egg, and provided interiorly with a weight embedded in said sponge rubber positioned to cause said toy to come to rest in an abnormal position.

4. A toy formed essentially of sponge rubber, having its surface of a contour and coloring closely simulating a colored Easter egg, and provided interiorly with a weight effective to cause said toy to come to rest in an abnormal position.

5. A toy formed essentially of sponge rubber, having its surface of a contour and coloring closely simulating a colored Easter egg, and provided interiorly with a weight embedded in said sponge rubber positioned to cause said toy to come to rest in an abnormal position.

In testimony whereof I hereunto affix my signature.

THOMAS W. MILLER.